(12) United States Patent
Wang

(10) Patent No.: US 7,903,723 B2
(45) Date of Patent: Mar. 8, 2011

(54) SELECTING DELAY VALUES FOR A RAKE RECEIVER

(75) Inventor: Xiaohui Wang, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 739 days.

(21) Appl. No.: 11/911,705

(22) PCT Filed: Apr. 5, 2006

(86) PCT No.: PCT/EP2006/003470
§ 371 (c)(1),
(2), (4) Date: Oct. 16, 2007

(87) PCT Pub. No.: WO2006/111334
PCT Pub. Date: Oct. 26, 2006

(65) Prior Publication Data
US 2008/0205556 A1 Aug. 28, 2008

Related U.S. Application Data

(60) Provisional application No. 60/673,286, filed on Apr. 20, 2005.

(30) Foreign Application Priority Data

Apr. 18, 2005 (EP) .................................... 05388035

(51) Int. Cl.
*H04B 1/00* (2006.01)
(52) U.S. Cl. ......... 375/148; 375/142; 375/147; 375/150; 375/316
(58) Field of Classification Search .................. 375/142, 375/147, 148, 150, 316
See application file for complete search history.

(56) References Cited

U.S. PATENT DOCUMENTS 7,209,512 B2 * 4/2007 Jitsukawa et al. ............. 375/148
7,480,536 B2 * 1/2009 Kaufman et al. ............... 700/79

* cited by examiner

*Primary Examiner* — Ted M Wang

(57) ABSTRACT

Multipath components of transmitted data symbols are received with individual delays and processed by a RAKE unit having a number of fingers. A delay profile is calculated, and delay values for peaks detected therein are determined. A number of peak delay values representing the largest peaks for the profile are pre-selected, and for each of them a signal-to-interference ratio for delay values in an interval around the pre-selected peak delay value is calculated. In each interval the delay value having the highest signal-to-interference ratio is selected and provided to the RAKE unit with each selected delay being assigned to a RAKE finger. Hereby the ability to select correct and accurate path delays can be improved also in time critical processes, where filtering of the delay profiles over several frames is not possible, because quite accurate delay values can be provided shortly after wake-up of the receiver.

14 Claims, 6 Drawing Sheets

SELECTING DELAY VALUES FOR A RAKE RECEIVER

This application claims the benefit of US Provisional Application No. 60/673,286, filed Apr. 20, 2005, the disclosure of which is fully incorporated herein by reference.

TECHNICAL FIELD OF THE INVENTION

The invention relates to a method of receiving digital data symbols sent from a transmitter through a transmission channel of a communications network, in which individual multipath components of a transmitted data symbol are received with individual delays, and wherein received signals are processed by a RAKE unit having a number of fingers, the method comprising the steps of calculating a delay profile from a set of received pilot signals; and determining delay values for peaks detected in the delay profile. The invention further relates to a receiver for coded digital data symbols, and to a corresponding computer program and computer readable medium.

DESCRIPTION OF RELATED ART

In wireless communications systems the physical channel between a transmitter and a receiver is typically formed by a radio link. As an example, the transmitter could be a base station, and the receiver could be a mobile station, or vice versa. In most cases the transmit antenna is not narrowly focused towards the receiver. This means that the transmitted signals may propagate over multiple paths. In addition to a possible direct path from the transmitter to the receiver, many other propagation paths caused by reflections from objects in the surroundings exist. Thus, the receiver may receive multiple instances of the same signal at different times, i.e. with different delays, because different portions of the signal are reflected from various objects, such as buildings, moving vehicles or landscape details.

These different portions of the signal are a cause of interference in the receiver. Depending on the time resolution of the transmission system and the instantaneous phase relationship, portions with similar propagation distances combine at the receiver and form a distinct multipath component. The effect of the combining depends on the instantaneous relationship of the carrier wavelength and distance differences, and it may thus for a given multipath component be either enhancing or destructive. In case of destructive interference, the combining leads to significant decrease of the magnitude, or fading, of the path gain for that path. Thus the gain of a true path may temporarily decrease considerably due to fading.

Many transmission systems try to reduce the effect of multipath propagation and fading by using receivers that combine the data symbol energy from all multipath components. In Code Division Multiple Access (CDMA) and Wide-band Code Division Multiple Access (WCDMA) systems the energy of the different received portions of the signal may be utilized in the receiver by using a so-called RAKE receiver.

In these systems spreading and despreading are used. Data are transmitted from the transmitter side using a spread spectrum modulation technique wherein the data are scattered across a wide range of frequencies. Each channel is assigned a unique spreading code that is used to spread the data across the frequency range. The spreading code is a pseudo-random noise code and is composed of e.g. a binary sequence of 1's and 0's, called "chips", which are distributed in a pseudo-random manner and have noise-like properties. The number of chips used to spread one data bit, i.e. chips/bit, may vary, and it depends, at least in part, on the data rate of the channel and the chip rate of the system.

In the receiver the received signal must be despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above. The performance of a CDMA receiver is improved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate.

Thus the RAKE receiver requires knowledge of the multipath delays and the values of the channel impulse response for all paths. To achieve the best possible signal-to-noise ratio (SNR) at the output of the RAKE combiner, the signal energy from as many physical paths as possible should be collected. The changing delays of all known multipath components should be tracked, and new paths should be discovered quickly after they appear. This is typically achieved by using a path searcher unit with an observation window shorter than the full search area. In a practical delay estimation system the path searcher unit is used periodically to re-scan the delay range with the purpose of detecting new paths.

The performance of a CDMA receiver depends heavily on the quality of the multipath delay detection unit. If the detected delays of the multipaths are off the correct values, the transmitted power carried by the paths are at least partly lost and the noise levels will be increased so that the performance of the receiver will be degraded. A usual way of finding the delays of the multipaths accurately is to accumulate power profiles of received pilot signals for sufficiently long time, and then filter the delay profiles over many radio frames so that the influence of the fading will be mitigated. The so-obtained power profiles are rather stable, and the detected delays are then delivered to the RAKE and channel estimator for further demodulations of the user data.

One of the basic requirements of such accurate delay detections is obviously sufficiently long time for accumulation of pilot symbols and filtering of power profiles. There are, however, time-critical processes in the CDMA systems for which this cannot be guaranteed, and for these processes the filtering technique is thus not applicable. To this category belongs paging, i.e. the process of seeking a user equipment or mobile phone from e.g. a base station. In order to save the power of the user equipment, paging is managed in a discontinuous way so that the radio frequency unit of the user equipment needs to wake up from sleeping only from time to time. During the short wake up period, the receiver has to find the delays of the paths and perform e.g. automatic frequency corrections and paging indicator detections. If a paging indication is detected for a receiver, it will decode associated information. Under such circumstances the detection time is critical, and thus the delay detections are in general rather rough, which may lead to e.g. missed paging indication and decoding errors of the paging messages if no further actions are taken.

While for the normal, non time critical cases, such as demodulating information in connected mode, the path search is performed by computing and filtering the delay profiles repeatedly in order to get the delays for the stable peaks averaged over time, for the time critical events, the delay values for the RAKE and the channel estimators have to be determined from the instantaneous delay profiles because it is temporally not possible to obtain the profiles filtered over long time.

Even for the non time critical case, in which the delays derived from the filtered delay profiles are the best values on the average, they may be off the optimal delays for some slots and thus degrade the performance of the receivers for those periods. However, the degradations overall will be rather limited, especially after the de-interleaving and decoding.

On the contrary, the problem with the time critical event is much more severe, because the degradation of the performance of the receivers due to inaccurate delay detections cannot be averaged out or corrected over many slots or frames. Thus e.g. for paging indication detections, only a couple of paging indication symbols are accumulated to decide if there is a paging or not. If it fails, the receiver will miss paging indication and get errors of the paging messages.

Therefore, it is an object of the invention to provide a method of detecting multipath components, which can improve the ability of selecting correct and accurate path delays also in time critical processes, where filtering of the delay profiles over several frames is not possible. It will be understood, though, that the principles of the invention are also applicable to other situations, when filtering over several frames is possible but not desirable.

SUMMARY

According to the invention the object is achieved in that the method further comprises the steps of pre-selecting a number of peak delay values among the peak delay values determined for the delay profile, said pre-selected peak delay values representing the largest peaks detected in the delay profile; calculating for each of said pre-selected peak delay values a signal-to-interference ratio for delay values in an interval around the pre-selected peak delay value; selecting in each interval the delay value having the highest signal-to-interference ratio; and providing the selected delay values to the RAKE unit and assigning each selected delay value to a finger of the RAKE unit.

By monitoring the signal-to-interference ratio values around the delays from the path searcher and then relocating the fingers of the RAKE according to the highest signal-to-interference ratio values, the performance of the receiver is improved considerably in time-critical cases such as paging, because quite accurate delay values can be provided in a very short time after wake-up of the receiver. At the same time, since the signal-to-interference ratio values need only be calculated for a few delay values around each peak, the required computational resources can still be kept at a low level.

When the method further comprises the step of rearranging the selected delay values to satisfy a minimal separation constraint, it is ensured that different RAKE fingers actually track different multipath delay signals.

In one embodiment, the method further comprises the steps of processing received signals to obtain pilot symbols and user data symbols simultaneously; and using said pilot symbols in the calculation of said signal-to-interference ratios. By processing the pilot signals and the user data signals simultaneously, a fast solution is achieved because the user data symbols will be ready as soon as they are needed. The method may then further comprise the steps of calculating channel estimates for each of said selected delay values; providing user data symbols corresponding to said selected delay values; and combining said channel estimates with said provided user data symbols. Alternatively, the method may further comprise the steps of calculating channel estimates for each of said selected delay values; setting channel estimates for remaining delay values to zero; providing user data symbols corresponding to all delay values; and combining said channel estimates with said provided user data symbols.

In another embodiment, the method further comprises the steps of storing received signals; processing received signals to obtain pilot symbols; using said pilot symbols in the calculation of said signal-to-interference ratios; processing stored signals to obtain user data symbols corresponding to said selected delay values; calculating channel estimates for each of said selected delay values; and combining said channel estimates with said provided user data symbols. By storing the received signals and then after the delay values for the RAKE fingers have been selected processing the user data signals only for the selected delays, computational resources can be saved.

As mentioned, the invention further relates to a receiver for digital data symbols sent from a transmitter through a transmission channel of a communications network, in which individual multipath components of a transmitted data symbol are received with individual delays, the receiver comprising a RAKE unit having a number of fingers for processing received signals, and the receiver being arranged to calculate a delay profile from a set of received pilot signals; and determine delay values for peaks detected in the delay profile. When the receiver is further arranged to pre-select a number of peak delay values among the peak delay values determined for the delay profile, said pre-selected peak delay values representing the largest peaks detected in the delay profile; calculate for each of said pre-selected peak delay values a signal-to-interference ratio for delay values in an interval around the preselected peak delay value; select in each interval the delay value having the highest signal-to-interference ratio; and provide the selected delay values to the RAKE unit and assign each selected delay value to a finger of the RAKE unit, a receiver is provided, which can improve the ability of selecting correct and accurate path delays also in time critical processes, where filtering of the delay profiles over several frames is not possible.

When the receiver is further arranged to rearrange the selected delay values to satisfy a minimal separation constraint, it is ensured that different RAKE fingers can actually track different multipath delay signals.

In one embodiment, the receiver is further arranged to process received signals to obtain pilot symbols and user data symbols simultaneously; and use said pilot symbols in the calculation of said signal-to-interference ratios. By processing the pilot signals and the user data signals simultaneously, a fast solution is achieved because the user data symbols will be ready as soon as they are needed. The receiver may then further be arranged to calculate channel estimates for each of said selected delay values; provide user data symbols corresponding to said selected delay values; and combine said channel estimates with said provided user data symbols. Alternatively, the receiver may then further be arranged to calculate channel estimates for each of said selected delay values; set channel estimates for remaining delay values to zero; provide user data symbols corresponding to all delay values; and combine said channel estimates with said provided user data symbols.

In another embodiment, the receiver is further arranged to store received signals; process received signals to obtain pilot symbols; use said pilot symbols in the calculation of said signal-to-interference ratios; process stored signals to obtain user data symbols corresponding to said selected delay values; calculate channel estimates for each of said selected delay values; and combine said channel estimates with said provided user data symbols. By storing the received signals and then after the delay values for the RAKE fingers have been selected processing the user data signals only for the selected delays, computational resources can be saved.

In some embodiments, the receiver may be a WCDMA receiver.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

Figure 1:
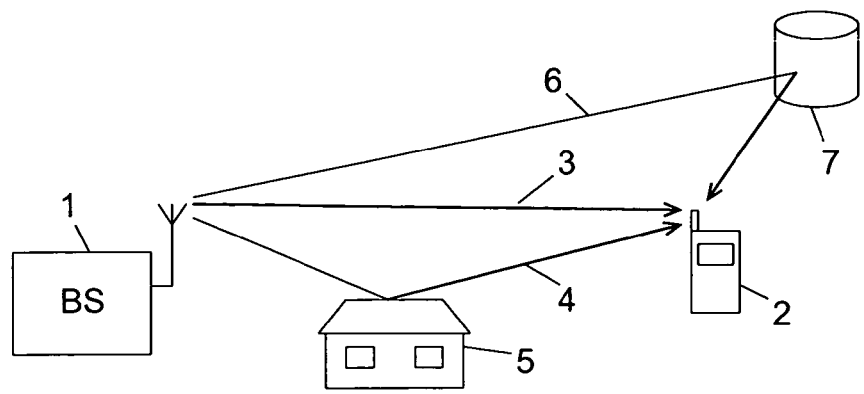
FIG. 1 shows an example of multiple paths between a base station and a mobile station.

FIG. 1 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different delays.

Figure 2:
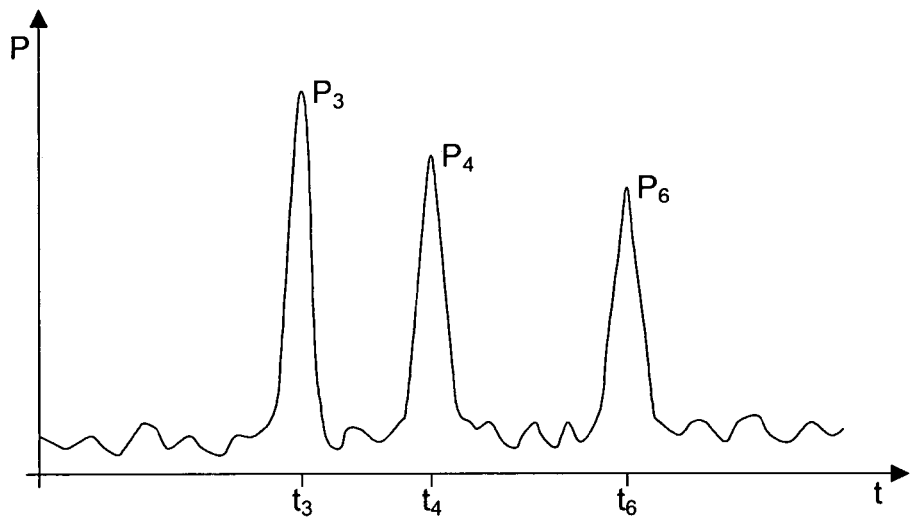
FIG. 2 shows a power delay profile for the paths illustrated in FIG. 1.

Thus, if a pilot signal is transmitted from the base station 1, the power P received at the mobile station 2 as a function of the time t may look as illustrated in FIG. 2, which shows an example of a power delay profile. The power delay profile shows all signals received at the mobile station, including noise and interference signals. However, only the peaks in the power delay profile correspond to the multipath components of the transmitted signal. Together these peaks form the impulse response of the channel. In FIG. 2 the peak $P_3$ received at the time $t_3$ corresponds to the direct path 3 in FIG. 1, while the peaks $P_4$ and $P_6$ received at the times 4 and $t_6$, respectively, correspond to the indirect paths 4 and 6 in FIG. 1. Thus, as an example, it is seen that the delay of the path 6 (corresponding to the peak $P_6$) is larger than the delay of the path 3 (corresponding to the peak $P_3$).

The delay profile shown in FIG. 2 is an instantaneous delay profile, and in such profiles noise peaks often occur in addition to the peaks representing the true peaks. Further, peaks representing true paths may momentarily fade, e.g. due to negative interference in the channel. Thus the true paths are not necessarily identical to the highest peaks in the instantaneous delay profile. However, the true paths typically have stable delay values for some time, while the noise peaks occur randomly. Further, the delays of the true paths may also vary slightly from time slot to time slot or from frame to frame. Therefore, the instantaneous delay profiles are normally filtered over a number of transmission frames in order to decrease the effect of the noise peaks and to obtain accurate and stable delay values.

Figure 3:
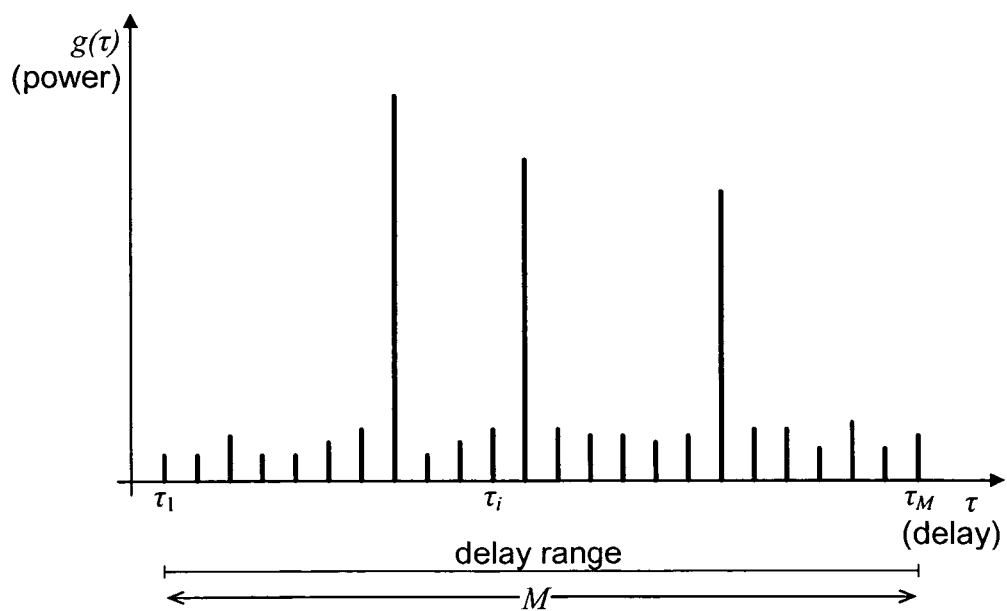
FIG. 3 shows a sampled delay profile corresponding to the profile shown in FIG. 2.

Typically, the delay profile of the received signal will not be available as a continuous curve as the one illustrated in FIG. 2. Instead, it will consist of a number of sample values. This is illustrated in FIG. 3, which shows a sampled power delay profile corresponding to the continuous delay profile shown in FIG. 2. For each delay value $\tau_i$ (where i ϵ[1,M], i.e. the full possible delay range), the corresponding power value $g(\tau_i)$ is shown. In this case the available estimates of the power delay profile constitutes a contiguous sequence of equally spaced samples, $\tau_i = \tau_0 + i\Delta\tau$.

The mobile station 2 and the base station 1 may be adapted for use in e.g. a Code Division Multiple Access (CDMA) system or a Wideband Code Division Multiple Access (WCDMA) system, and in that case the mobile station 2 may use a RAKE receiver, which is capable of identifying and tracking the various multipath signals for a given channel. In this way the energy or power of several multipath components can be utilized in the receiver. In the RAKE receiver each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate. Thus the RAKE receiver requires knowledge of the multipath delays and the values of the channel impulse response for all paths. The signal energy from as many physical paths as possible should be collected. This knowledge can be obtained from the delay profiles.

Although reference is here made to a RAKE receiver in a mobile station, it should be noted that the algorithms described below may be used at any CDMA receiver, i.e. in a mobile station or a base station, and the transmission direction may be uplink or downlink.

Figure 4:
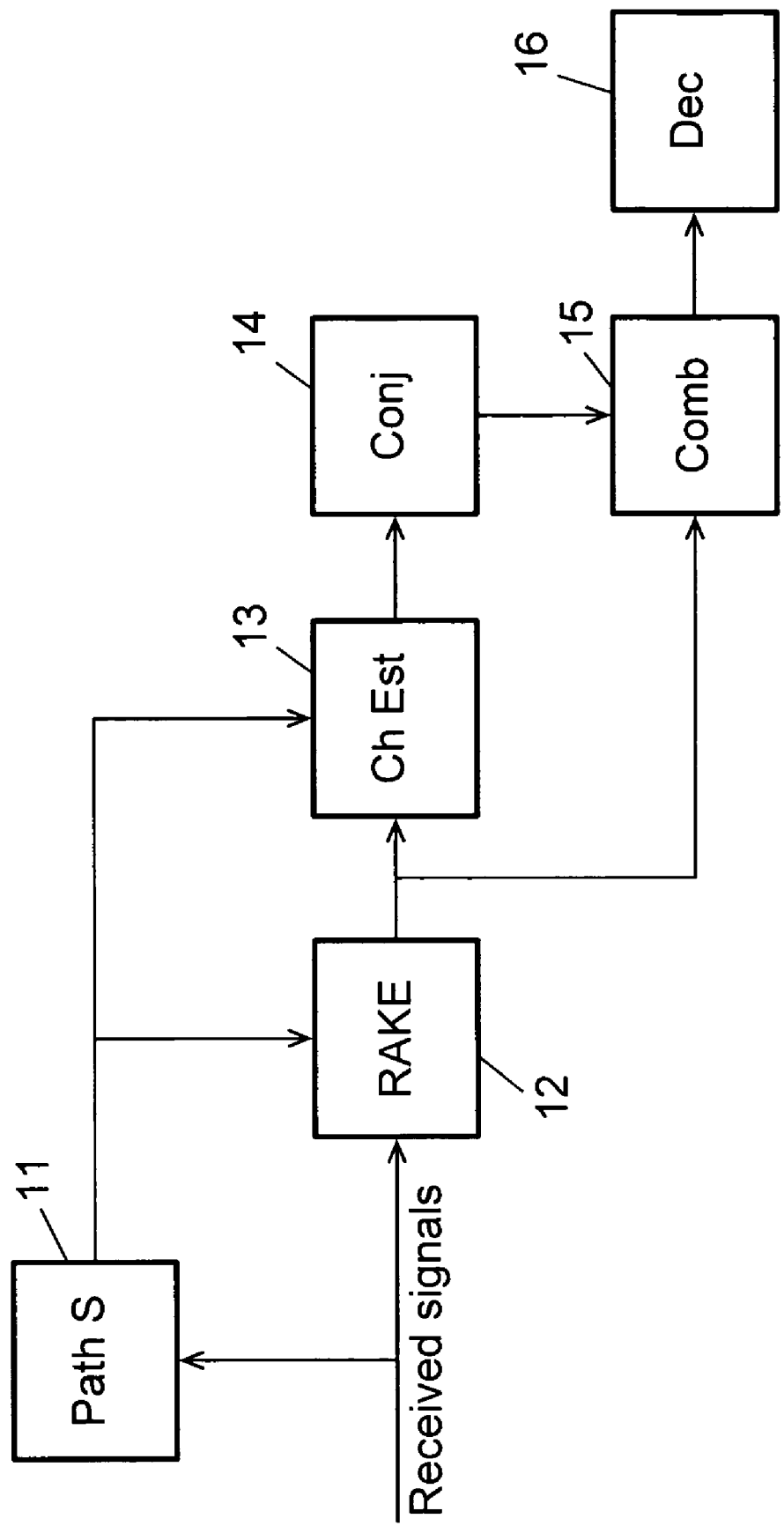
FIG. 4 shows an overview of a RAKE receiver.

Since the structure of the propagation channel does not remain constant over time, the delays of existing paths change, old paths disappear and new paths appear. The changing delays of all known multipath components should be tracked, and new paths should be discovered quickly after they appear. Therefore, infrequently activated limited-range path searchers are typically used for detecting new paths and, in some implementations, for re-detecting temporarily faded existing paths. This is illustrated in FIG. 4, which shows an overview of a RAKE receiver.

In the receiver, the received spread data signals are supplied to the path searcher 11 and the RAKE unit 12. The path searcher 11 is a device that periodically computes instantaneous impulse response estimates (complex or power) over a range of delays that is also called a path search window. The complex or power values for a given delay value may be estimated e.g. by correlating the received data for pilot symbols with an appropriately delayed copy of the spreading sequence. Since the path searcher 11 is mainly used only to detect the existence of paths, its output resolution may be lower than that required by the RAKE unit 12. The detected path delays, i.e. the delays representing peaks in the delay profile, are then delivered to the RAKE unit 12 and a channel estimator 13.

The received signals are then despread in the RAKE unit 12, in which each reported delay is assigned a RAKE finger, and each RAKE finger presents a complex despread data symbol. In the channel estimator 13 channel estimates for each path are calculated from the despread data symbols provided by the RAKE unit 12 and the detected delays provided by the path searcher 11. In the combiner 15 the despread data symbols provided by the RAKE unit 12 are multiplied by the conjugated channel estimates (provided by the conjugating unit 14) and the results used for further decoding in the decoder 16.

In connected mode, i.e. when the receiver is already in the process of receiving data signals, a usual way of finding the delays of the multipaths accurately is to accumulate the power profiles of the pilots for sufficiently long time, and then filter the delay profiles over many radio frames so that the influence of the fading will be mitigated and stable peaks averaged over time will be achieved.

As mentioned, during normal reception of data the instantaneous delay profiles are typically filtered over a number of frames to ensure stable and correct values. However, in the CDMA systems there are also some time critical processes for which the filtering technique can not be used. Paging is an example of such a time critical process. Paging is the process where e.g. a base station seeks to get in contact with a passive user terminal. Most of the time the passive user terminal is in a sleep mode, and only from time to time it wakes up from the sleep mode to check if a paging signal for that terminal is present. During this short time the device has to find the delays of the paths in the transmission channel, perform e.g. automatic frequency corrections and paging indicator detections, and if a Paging Indicator (PI) is actually detected for the device it will decode the information on the Paging Channel (PCH), which e.g. in a 3GPP network is transmitted on the Secondary Common Control Physical Channel (S-CCPCH). The available time for path detection during the wake-up period does not allow the use of filtering as described above, and since the time intervals between the wake-up events are rather long, the delay profiles measured during different wake-up periods are typically not sufficiently correlated to be used for filtering. In this situation the method described below can be used to ensure stable and correct values. It will be understood, though, that the embodiments of the invention are also applicable to other situations, when filtering is possible but not desirable.

Figure 5:
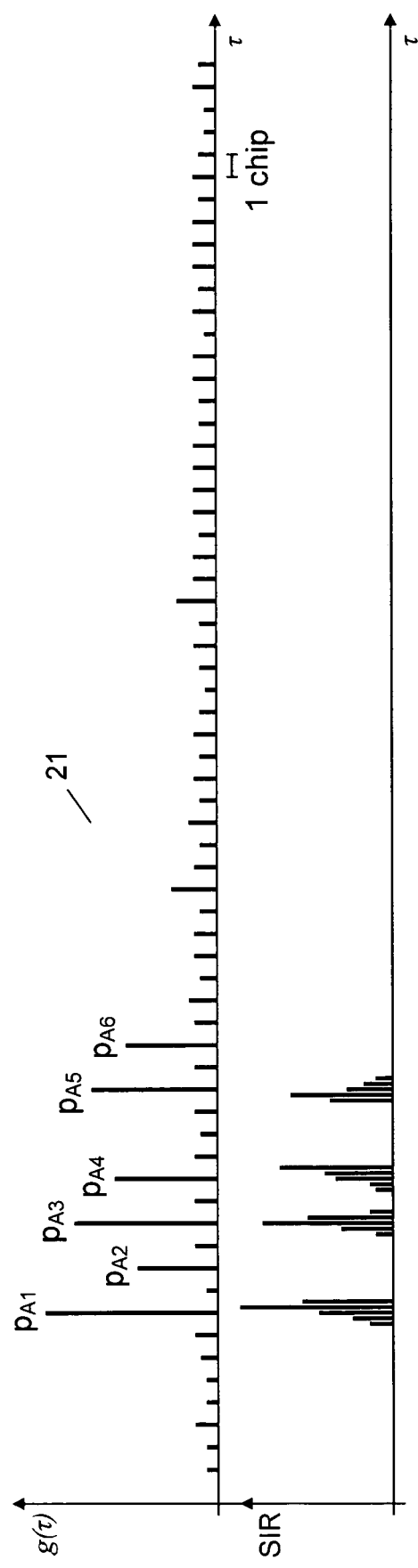
FIG. 5 illustrates a sampled delay profile with a low resolution and the calculation of signal-to-interference ratios around peaks in the delay profile.
Figure 6:
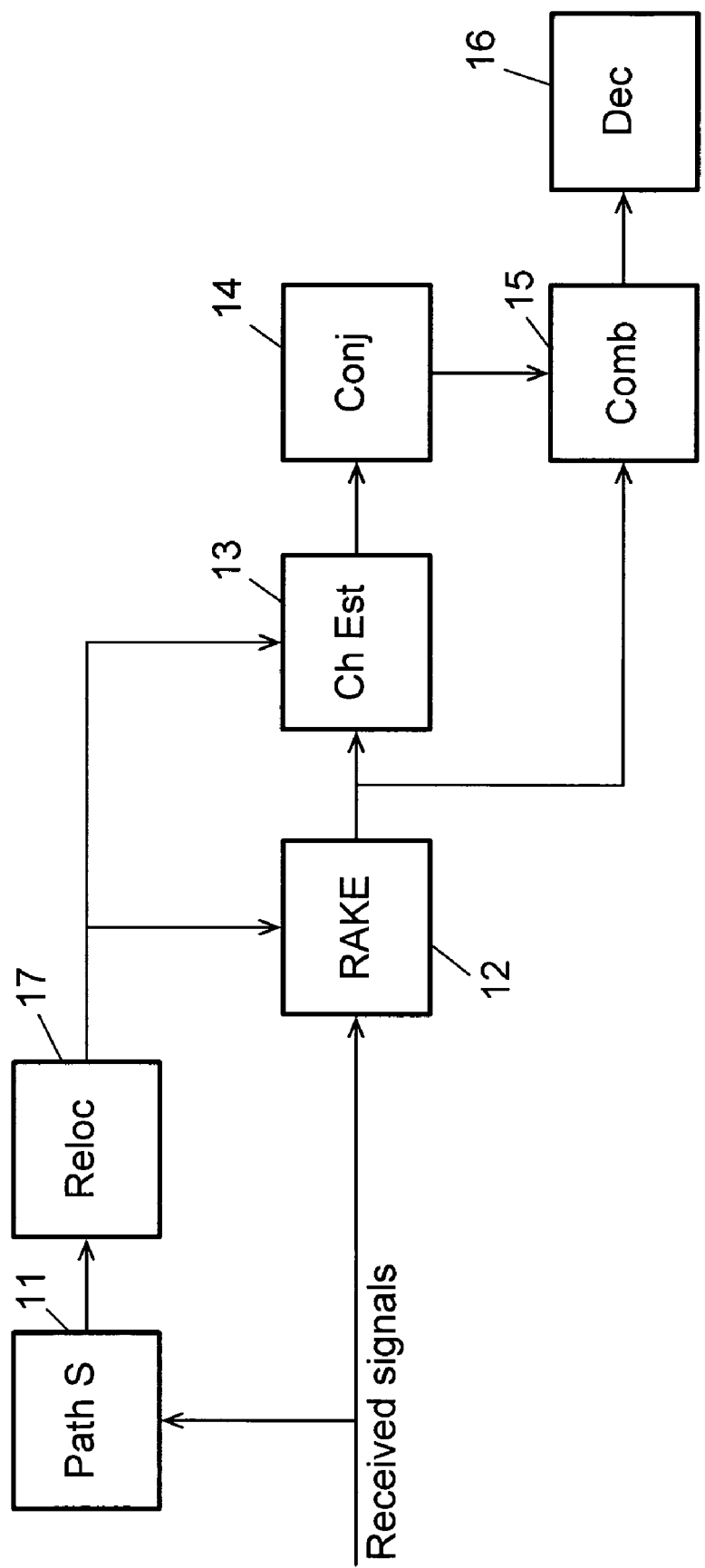
FIG. 6 shows an overview of a RAKE receiver with a relocation unit included.

The first step in estimating the true path delays during a wake-up period is to perform a coarse path search of an instantaneous delay profile over a delay range of e.g. 128 chips with a resolution of e.g. one chip. In the upper part of FIG. 5 is for illustrational purposes shown an instantaneous delay profile 21 with a delay range of 64 chips with a resolution of e.g. one chip. In this example the coarse path searcher finds six peaks, i.e. $p_{A1}$, $p_{A2}$, $p_{A3}$, $p_{A4}$, $p_{A5}$ and $p_{A6}$. The purpose of this coarse path search is to find the regions of the strongest paths, and although the results are not very accurate, due to the low resolution and the fact that the delay profile has not been filtered, the delays delivered from the path searcher are typically not far away from the true values. Therefore, since the RAKE as well as the channel estimator actually need the accurate delay to get highest power and lowest noise for each path, the delays provided by this first coarse path search can be improved by searching around them for the delay corresponding to the highest power and lowest noise for each path, e.g. on the slot basis, and then relocating the RAKE fingers and channel estimator accordingly. This can be done by calculating a signal-to-interference ratio (SIR) for the delay values in a small interval around each of the delays provided by the coarse path search. In FIG. 6 this is performed in the relocating unit 17. Since the SIR values are only calculated for a few delay values around the found peaks, the computational resources needed for the SIR calculations are rather limited, which allows the solution to be implemented even in receivers having only a limited processing capacity.

According to one embodiment, the RAKE fingers are thus not located to the delays directly from the path searcher. Instead, the SIR values around the first few strongest delays are monitored, e.g. a quarter chip away on both sides of a strong path, or a quarter chip and a half chip away on both sides of a strong path, and the delay with the highest SIR value is then chosen as a delay candidate for this path. This is illustrated in the lower part of FIG. 5 showing the SIR values calculated around the four strongest peaks, i.e. $p_{A1}$, $p_{A3}$, $p_{A4}$ and $p_{A5}$ of the upper part of the figure. It can be seen that in this example the highest SIR value around peak $p_{A1}$ is found at the delay value one quarter chip above the delay originally provided by the coarse path search, while for peak $p_{A3}$ the originally provided value was actually the one with the highest SIR value. For peak $p_{A4}$ the highest SIR value is found at the delay value two quarter chips above the delay originally provided, and for peak $p_{A5}$ one quarter chip below the original delay.

Figure 7:
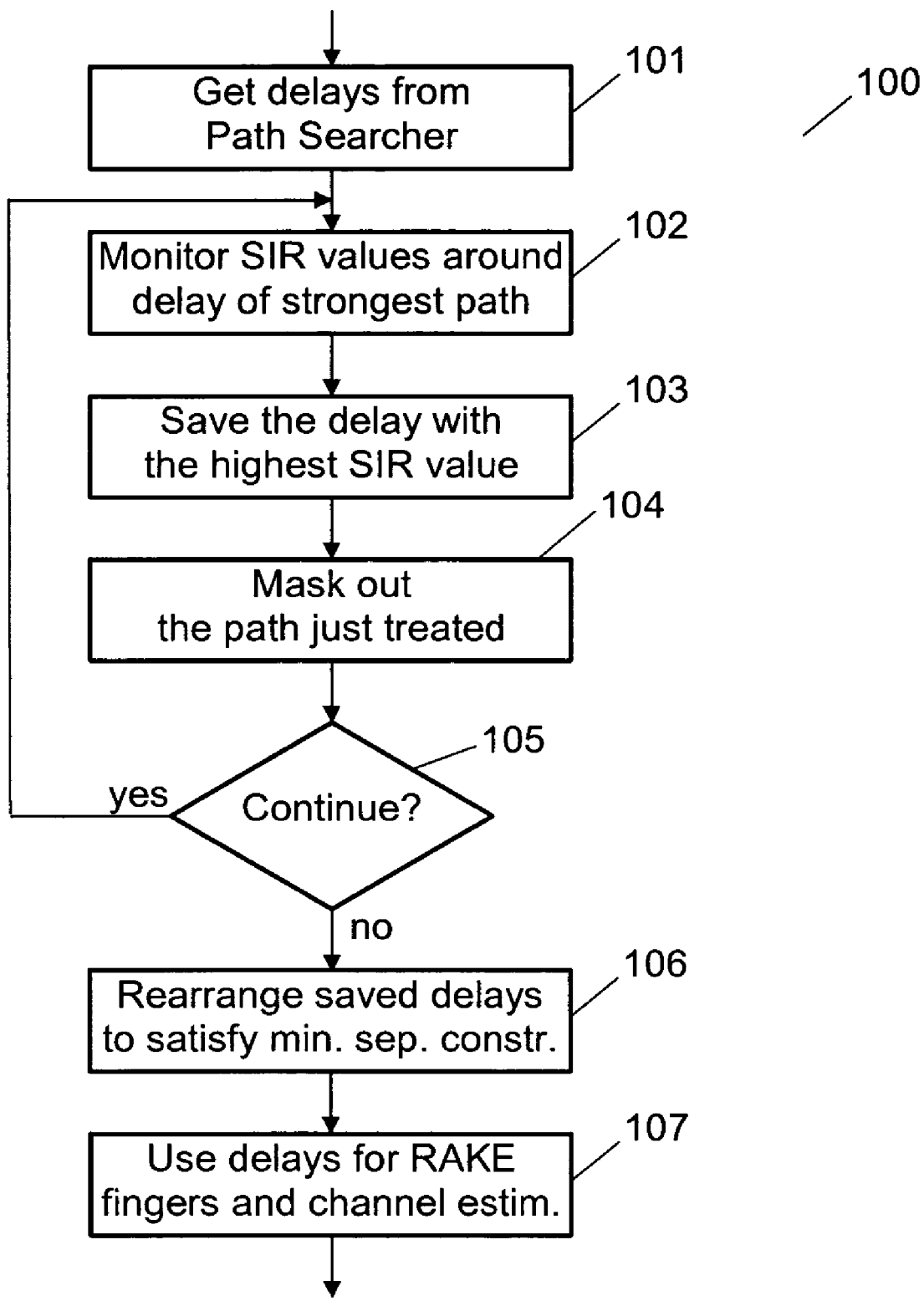
FIG. 7 shows a flow chart illustrating the principle of delay relocation.

A flow chart 100 illustrating the principle of the delay relocations performed in the relocating unit 17 is shown in FIG. 7. First, in step 101 the delays are received from the path searcher 11. In step 102 the SIR values around the delay of the strongest path are calculated and monitored. How the SIR values are calculated will be described later with reference to the flow chart of FIG. 8. Next, in step 103 the delay with the highest SIR value of those just calculated is selected and stored as the delay to represent this path. The path just treated is then masked out, i.e. removed from the group of paths to be examined, in step 104, and it is decided in step 105 whether further paths need to be considered. If this is the case, steps 102 to 105 are repeated for the path which is now the strongest. In the example illustrated in FIG. 5, the four strongest paths are considered, which corresponds to a RAKE unit with four fingers. When the sufficient number of paths have been treated, the saved delays may be rearranged in step 106 to satisfy a minimal separation constraint requiring a certain minimal distance between neighbouring paths. This constraint ensures that different RAKE fingers actually track different multipath delay signals. In the example of FIG. 5 all paths already satisfy this constraint. The resulting delays are then used for the RAKE fingers and the channel estimator to demodulate the user data in step 107. The locations of the RAKE delays can be determined on the slot basis so that the receivers can use the transmitted power more efficiently in a dynamic manner.

Figure 8:
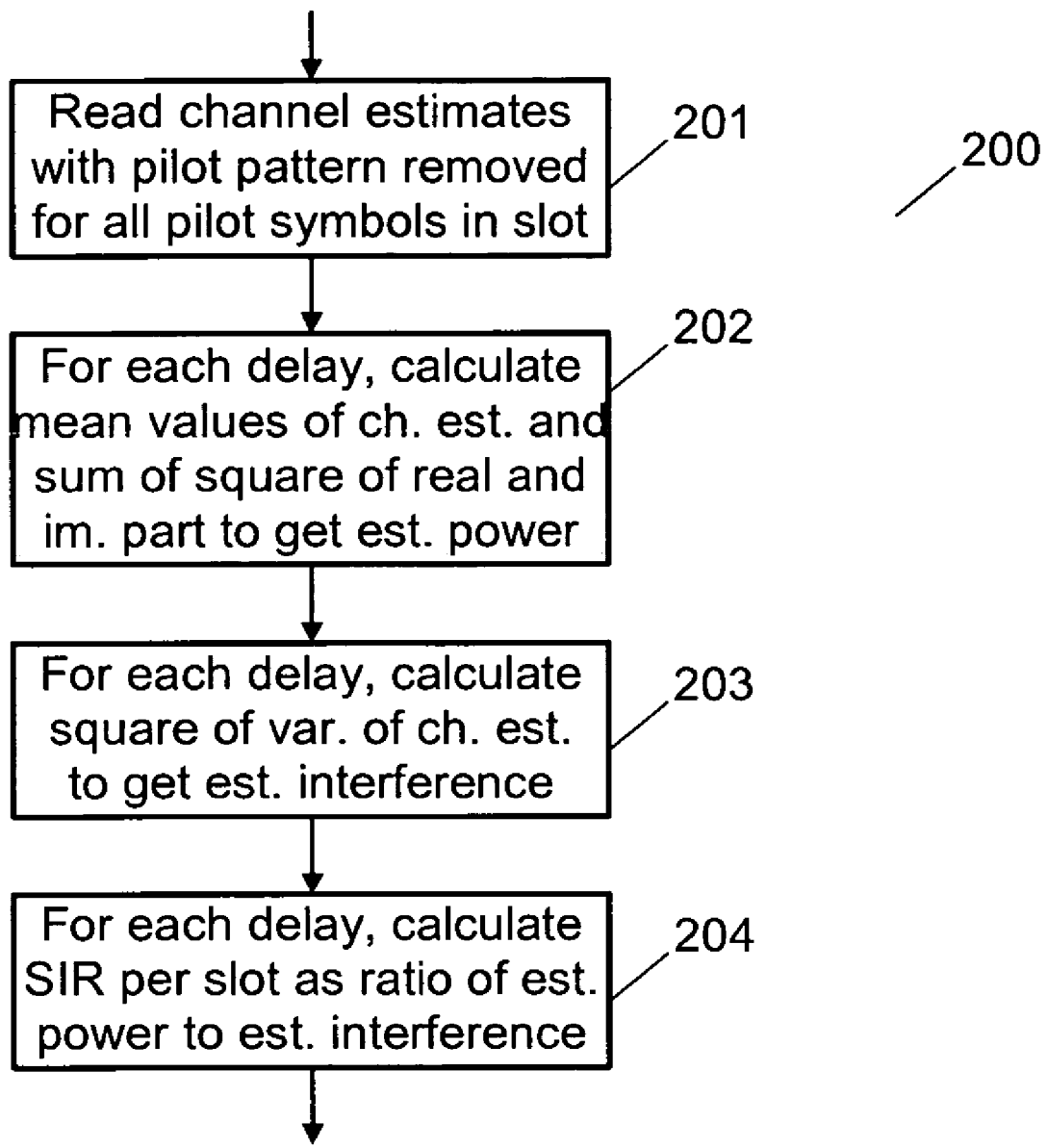
FIG. 8 shows a flow chart illustrating the calculation of signal-to-interference ratios.

As mentioned, the flow chart 200 in FIG. 8 shows how the SIR values are calculated in step 102 of FIG. 7. First, in step 201, the channel estimates with the pilot pattern removed for all pilot symbols in a slot are read. It is noted that for each delay from the coarse path search and its neighbours, the channel estimates are obtained by multiplying the despread pilot symbols from the RAKE with the complex conjugates of the corresponding sent pilot symbols to remove the pilot patterns. Then, in step 202, the mean values of the channel estimates and then the sum of the square of the real and the imaginary part are calculated for each delay to get the estimated power. In step 203 the square of the variance of the channel estimates is calculated for each delay to get the estimated interference. Finally, in step 204, for each delay the SIR is calculated per slot as the ratio of the estimated power to the estimated interference.

The use of the resulting delays in the RAKE unit and the channel estimator differs from the normal connected mode where the delays to be used in a given time slot may be calculated from previously received data. In the present situation, the delays might need to be used for the demodulation of the data received in the same time slot. A few different ways of doing this will be described in the following. The method chosen in the specific case may depend on the partition between hardware and software in the implementation of the receiver. In the following implementations it is understood that the channelization codes and the pilot patterns are known in the receiver, and that the delays are the ones from the path searcher and their neighbours, and thus the RAKE, e.g. for the Common Pilot Channel (CPICH), can be operated directly after the coarse path search to get the channel estimates and SIR values for all possible delay candidates. The best delay values are then selected from the fine SIR profiles and used to combine the user data on the Dedicated Physical Channel (DPCH). On the other hand, the path searcher calculates the power profiles for all sampling points within the delay window in order to find the delays of the strong paths, which is a separated unit and does not need a RAKE.

In one implementation, the pilot signals from the Common Pilot Channel (CPICH) and the user data are despread simultaneously, the CPICH symbols are used to calculate the SIR values, and then the despread symbols and the corresponding channel estimates are delivered to the combiner only for the delays that have been located as described above.

An alternative is to deliver the despread symbols for all the delays from the path searcher and their neighbours to the combiner, yet the channel estimates of the non-located delays are set to zero for the combiner so that they are in fact excluded from the combined symbols.

In a different implementation it is also possible to record the received signals while using CPICH symbols to compute the SIR values, and then only do the despreading for the located delays and estimating their channel coefficients for the combiner.

Although embodiments of the present invention have been described and shown, the invention is not restricted to it, but may also be embodied in other ways within the scope of the subject-matter defined in the following claims.

The invention claimed is:

1. A method of receiving digital data symbols sent from a transmitter through a transmission channel of a communications network, in which individual multi-path components of a transmitted data symbol are received with individual delays, and wherein received signals are processed by a RAKE unit having a number of fingers, the method comprising the steps of:
    calculating a delay profile from a set of received pilot signals;
    determining delay values for peaks detected in the delay profile;
    pre-selecting a number of peak delay values among the peak delay values determined for the delay profile, said pre-selected peak delay values representing the largest peaks detected in the delay profile;
    calculating for each of said pre-selected peak delay values a signal-to-interference ratio for delay values in an interval around the pre-selected peak delay value;
    selecting in each interval the delay value having the highest signal-to-interference ratio; and
    providing the selected delay values to the RAKE unit and assigning each selected delay value to a finger of the RAKE unit.

2. The method according to claim 1, further comprising the step of rearranging the selected delay values to satisfy a minimal separation constraint.

3. The method according to claim 1, further comprising the steps of:
    processing received signals to obtain pilot symbols and user data symbols simultaneously; and
    using said pilot symbols in the calculation of said signal-to-interference ratios.

4. The method according to claim 3, further comprising the steps of:
    calculating channel estimates for each of said selected delay values;
    providing user data symbols corresponding to said selected delay values; and
    combining said channel estimates with said provided user data symbols.

5. The method according to claim 3, further comprising the steps of:
    calculating channel estimates for each of said selected delay values;
    setting channel estimates for remaining delay values to zero;
    providing user data symbols corresponding to all delay values; and
    combining said channel estimates with said provided user data symbols.

6. The method according to claim 1 further comprising the steps of:
    storing received signals;
    processing received signals to obtain pilot symbols;
    using said pilot symbols in the calculation of said signal-to-interference ratios;
    processing stored signals to obtain user data symbols corresponding to said selected delay values;
    calculating channel estimates for each of said selected delay values; and
    combining said channel estimates with said provided user data symbols.

7. A receiver for digital data symbols sent from a transmitter through a transmission channel of a communications network, in which individual multipath components of a transmitted data symbol are received with individual delays, the receiver comprising:
    a RAKE unit having a number of fingers for processing received signals, and
    the receiver further being arranged to:
    calculate a delay profile from a set of received pilot signals; and determine delay values for peaks detected in the delay profile;
    pre-select a number of peak delay values among the peak delay values determined for the delay profile, said pre-selected peak delay values representing the largest peaks detected in the delay profile;
    calculate for each of said pre-selected peak delay values a signal-to-interference ratio for delay values in an interval around the pre-selected peak delay value;
    select in each interval the delay value having the highest signal-to- interference ratio; and
    provide the selected delay values to the RAKE unit and assign each selected delay value to a finger of the RAKE unit.

8. The receiver according to claim 7, wherein the receiver is further arranged to rearrange the selected delay values to satisfy a minimal separation constraint.

9. The receiver according to claim 7, wherein the receiver is further arranged to:
    process received signals to obtain pilot symbols and user data symbols simultaneously; and
    use said pilot symbols in the calculation of said signal-to-interference ratios.

10. The receiver according to claim 9, wherein the receiver is further arranged to:
    calculate channel estimates for each of said selected delay values;
    provide user data symbols corresponding to said selected delay values; and
    combine said channel estimates with said provided user data symbols.

11. The receiver according to claim 9, wherein the receiver is further arranged to:
    calculate channel estimates for each of said selected delay values;
    set channel estimates for remaining delay values to zero;
    provide user data symbols corresponding to all delay values; and
    combine said channel estimates with said provided user data symbols.

12. The receiver according to claim 7, wherein the receiver is further arranged to:
    store received signals;
    process received signals to obtain pilot symbols;
    use said pilot symbols in the calculation of said signal-to-interference ratios;
    process stored signals to obtain user data symbols corresponding to said selected delay values;
    calculate channel estimates for each of said selected delay values; and
    combine said channel estimates with said provided user data symbols.

13. The receiver according to claim 7 wherein the receiver is a WCDMA receiver.

14. A computer-readable non-transitory storage medium comprising computer program code, when executed by a computer processor, the computer program code is configured to:
    calculate a delay profile from a set of received pilot signals;
    determine delay values for peaks detected in the delay profile;
    pre-select a number of peak delay values among the peak delay values determined for the delay profile, said pre-selected peak delay values representing the largest peaks detected in the delay profile;
    calculate for each of said pre-selected peak delay values a signal-to-interference ratio for delay values in an interval around the pre-selected peak delay value;
    select in each interval the delay value having the highest signal-to-interference ratio; and
    provide the selected delay values to the RAKE unit and assigning each selected delay value to a finger of the RAKE unit.

* * * * *

UNITED STATES PATENT AND TRADEMARK OFFICE
CERTIFICATE OF CORRECTION

| | | |
|---|---|---|
| PATENT NO. | : 7,903,723 B2 | Page 1 of 1 |
| APPLICATION NO. | : 11/911705 | |
| DATED | : March 8, 2011 | |
| INVENTOR(S) | : Wang | |

It is certified that error appears in the above-identified patent and that said Letters Patent is hereby corrected as shown below:

In Column 5, Line 63, delete "4" and insert -- $t_4$ --, therefor.

In Column 10, Line 64, in Claim 7, delete "signal-to- interference" and insert -- signal-to-interference --, therefor.

Signed and Sealed this
Eighth Day of November, 2011

David J. Kappos
*Director of the United States Patent and Trademark Office*